United States Patent Office 3,421,299
Patented Jan. 14, 1969

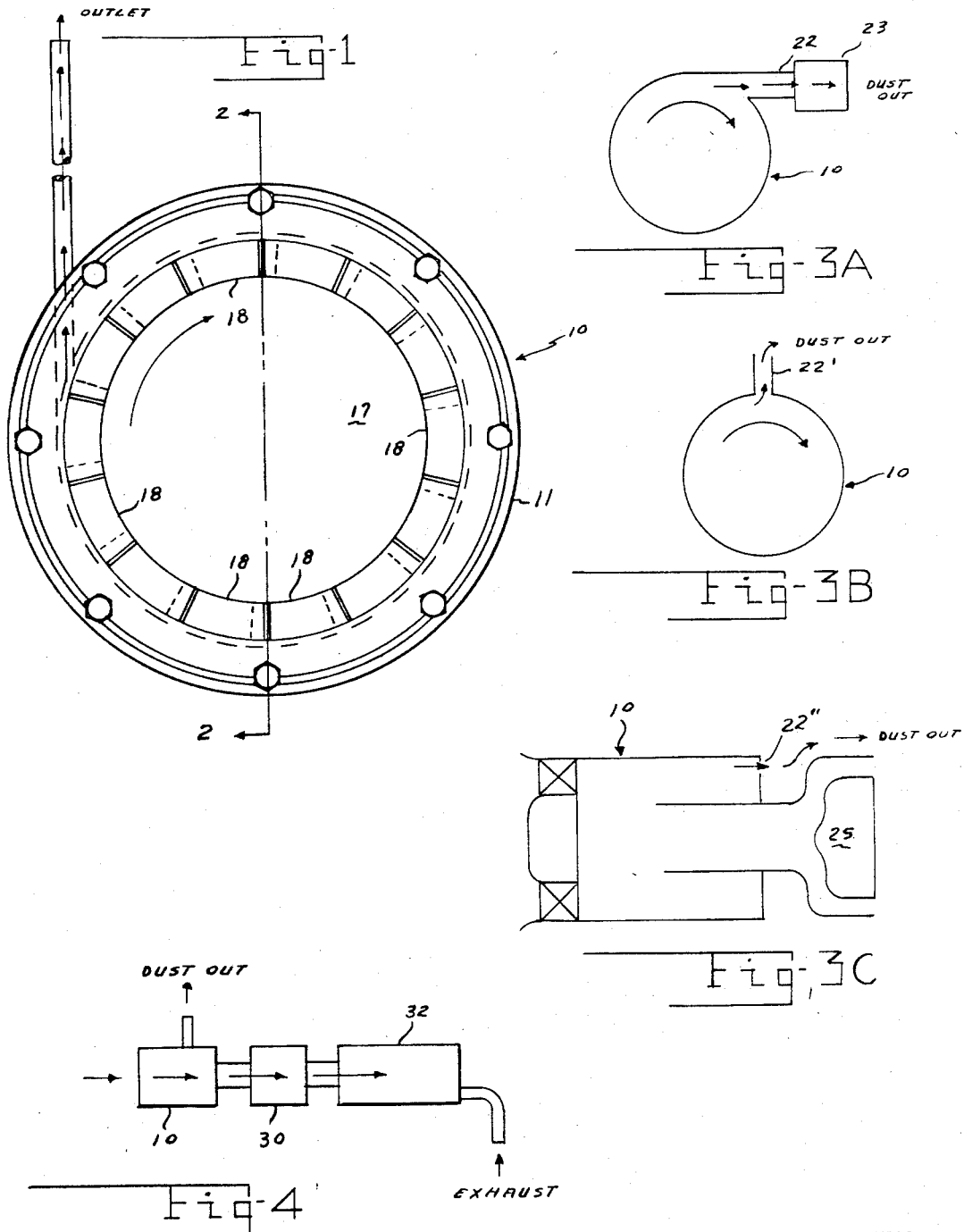

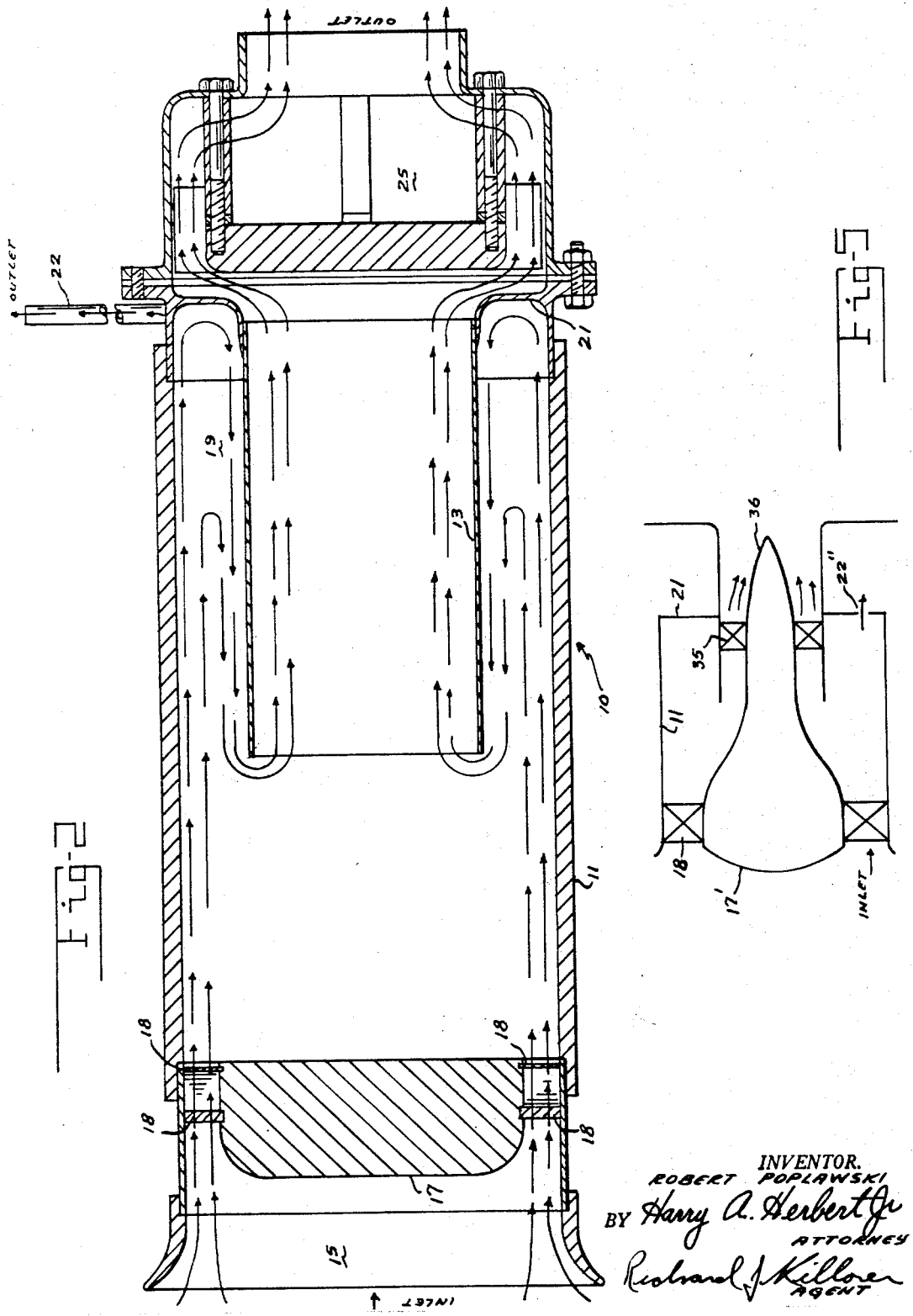

3,421,299
PARTIAL REVERSE FLOW SEPARATOR
Robert Poplawski, Fairborn, Ohio, assignor to the United States of America as represented by the Secretary of the Air Force
Filed Jan. 22, 1968, Ser. No. 699,578
U.S. Cl. 55—448        1 Claim
Int. Cl. B01d 45/12

ABSTRACT OF THE DISCLOSURE

In a centrifugal separator a reverse flow annular space is provided between the wall of the separator unit and a centrally disposed outlet conduit. Inlet vanes for imparting swirl to the incoming particle laden gas are located around a central hub which has a larger diameter than outlet conduit. A diffuser is located in the outlet conduit.

Background of the invention

Centrifugal separator units are used in the exhaust stacks of steel plants and concrete plants to remove solid particles from a flowing gas. In some of these units, the gas containing the solid particles is passed through vanes which impart a swirling motion to the particle-gas mixture. The swirl motion given to the gas operates to throw the particles toward the wall of the separator by centrifugal force. Thus the gas stream is divided into a clean, central portion and a particle-laden outer portion. An outlet conduit is positioned in the central portion of the stream to collect the clean, central portion of the gas stream. The particle-laden outer portion is directed into the annular space between the inner conduit and the outer wall of the separator. The solid particles are then removed from the annular space either tangentially, radially or axially. Vanes are provided in the outlet conduit to change the swirling motion to longitudinal motion.

Summary of the invention

According to this invention, the inlet vanes, of a centrifugal separator unit, are positioned around a large hub which has a diameter larger than the diameter of the outlet conduit. Also a larger annular space is provided around the outlet conduit. Thus, when the gas from the inlet vanes is directed into the annular space around the outlet conduit, there is a reverse flow of gas in this annular space and the gas returns toward the input end of the outlet conduit. The smaller particles that are not removed initially at the outer radius, proceed inward to regions of higher rotational velocities where they are gradually centrifuged to larger radii and eventually remix with the incoming particle-gas mixture, wherein some agglomeration may take place. This separator may be used on the inlets of turbine or other type engines for the removal of airborne dust. This will increase the life of absolute paper filters and, in some cases, may make the use of such paper filters unnecessary because of the high separation efficiency of the particle separator of the invention.

Brief description of the drawing

FIG. 1 is an end view of a centrifugal separator according to the invention;

FIG. 2 is a longitudinal sectional view of the centrifugal separator taken along the line 2—2 of FIG. 1;

FIG. 3A is a schematic view showing one possible particle extraction system for the device of FIG. 1;

FIG. 3B is a schematic view showing another possible particle extraction system for the device of FIG. 1;

FIG. 3C is a schematic view showing a further possible particle extraction system for the device of FIG. 1;

FIG. 4 is a schematic block diagram showing a use for the device of FIG. 1; and

FIG. 5 is a schematic diagram showing a further possible embodiment of the invention.

Description of the preferred embodiment

Reference is now made to FIGS. 1 and 2 of the drawing, which show a particle separator 10. The separator 10 has an outer elongated conduit wall member 11 with an output conduit 13 positioned within the wall member 11. The input end 15 of separator 10 has a hub 17 with conventional swirl vanes 18 positioned around the periphery thereof. The hub 17 has a diameter larger than the outer diameter of output conduit 13. The end of output tube 13 extends toward hub 17 a distance determined by the relative diameters of hub 17 and tube 13 and other design considerations such as the pitch of vanes 18 and the efficiency desired.

For optimum efficiency the end of tube 13 should extend toward hub 17 by a distance of about 60% of the total length of wall member 11, or more.

An annular space 19 is provided between the conduit 13 and the outer tubular member 11. The radial dimension of space 19 is greater than the radial dimension of vanes 18. The annular space 19 is closed at one end by an end wall 21 and thus provides a reverse flow path for the gas stream. The solid particles may be removed by means of tangential extraction opening 22 shown in FIG. 3A, by means of radial extraction opening 22' shown in FIG. 3B or axial extraction openings 22" as shown in FIG. 3C. Also a blower such as shown at 23 in FIG. 3A may be provided to aid in the extraction of the dust particles. A conventional diffuser section 25 for converting the rotational velocity to longitudinal velocity is provided in the output of conduit 13.

In the operation of the device, the particle-laden gas enters the end portion 15 and is given a swirl by swirl vanes 18. The swirling gas proceeds down along the tubular member 11 into the annular space 19. The larger particles are gradually centrifuged to larger radii toward wall member 11. The particles are extracted at the end of the annular space near end wall 21 by means of the particle outlet 22. The smaller particles proceed radially inward to regions of higher rotational velocities, due to the conservation of angular momentum, and are therefore centrifuged to larger radii, and remix with the incoming particle-gas mixture. They are then removed in the manner described above.

The swirl is removed from the clean gas in output conduit 13 by means of diffuser 25 in the conventional manner.

The separator may be used with a turbine or internal combustion engine as shown in FIG. 4. The incoming particle-laden air passes through the partial reverse flow separator 10 of the invention. The clean air is then passed through an absolute paper filter 30 which removes any extremely fine particles that are too small to be removed by separator 10. The output air of filter 30 is then supplied to engine 32 in the conventional manner. If a higher thru flow of air is needed, than can be obtained by using a single separator, then two or more separator units can be clustered together for higher thru flow capability. If higher separation efficiencies from the partial reversed flow separator of the invention is desired, the units can be geometrically scaled down to yield higher separation efficiencies. One clustered scaled-down version designed and tested is capable of over 96% separation efficiency with scavenge air flow of less than 5% when used to separate 0 to 200 microns Arizona road dust.

While a cylindrical outer wall and an outlet conduit are shown, other shapes may be used, for example, the outer wall member 11 may be conical with the larger end of the cone adjacent wall 21.

Also through the diffuser 25 is shown at the output end of conduit 13, it may be located at the input end as shown in the patent to Griffen No. 2,506,298, or within the conduit as shown in FIG. 5. The diffuser vanes 35 are located around a hub 36. The hub 36 may be made continuous with the hub 17' to make the device easier to fabricate. A device constructed in this manner was found to function as well as with separate hubs and for some applications was found to give improved results.

There is thus provided a centrifugal separator unit capable of higher separator efficiencies and lower percentage scavenge air flow than prior art devices.

While certain specific embodiments have been described, it is obvious that numerous changes may be made without departing from the general principles and scope of the invention.

I claim:
1. A device for separating solid particles from a particle-laden gas stream, comprising: a first elongated cylindrical element for receiving the particle-laden gas stream; means, at one end of said cylindrical element, for imparting a swirl motion to the particle-laden gas stream; a second cylindrical element, located within said first cylindrical element at the end thereof remote from said swirl imparting means, for receiving output gas; means, including a plurality of diffuser vanes within said second cylindrical element, for removing the swirl motion from the output gas; a central hub located within the swirl imparting means and having a portion extending into the second cylindrical element adjacent the diffuser vanes and also forming a central hub for the swirl removing means; said central hub having a diameter, adjacent the means for imparting a swirl to the gas, which is substantially larger than the diameter of said second cylindrical element and being gradually tapered toward a much smaller diameter adjacent the swirl removing means to thereby provide a narrow annular inlet opening to said second cylindrical element; means, including an end wall member, said first cylindrical element and said second cylindrical element, in longitudinal line with the swirl imparting means, for providing a reverse flow space for gas between the first cylindrical element and the second cylindrical element and means formed in said end wall member for removing the solid particles from the space between the first cylindrical element and the second cylindrical element.

References Cited
UNITED STATES PATENTS

| | | | |
|---|---|---|---|
| 1,723,427 | 8/1929 | Kamrath | 55—457 |
| 1,746,218 | 2/1930 | Kamrath | 55—416 |
| 2,370,629 | 3/1945 | Appeldoorn | 55—451 |
| 2,732,032 | 1/1956 | Sandison | 55—457 |
| 3,064,411 | 11/1962 | Breslove | 55—457 |

HARRY B. THORNTON, *Primary Examiner.*

U.S. Cl. X.R.

55—457